United States Patent [19]

Ameter

[11] Patent Number: 4,995,798
[45] Date of Patent: Feb. 26, 1991

[54] APPARATUS FOR WINDSHIELD REPAIR

[76] Inventor: Stephen L. Ameter, 1715 Linda La., Olney, Ill. 62450

[21] Appl. No.: 374,946

[22] Filed: Jun. 30, 1989

[51] Int. Cl.⁵ .......................................... B32B 35/00
[52] U.S. Cl. ..................................... 425/012; 156/94; 264/36; 425/13
[58] Field of Search ................... 156/94, 382; 264/36, 264/102; 425/11-13, 405.1

[56] References Cited

U.S. PATENT DOCUMENTS

| | | | |
|---|---|---|---|
| 3,562,366 | 2/1971 | Sohl | 264/23 |
| 3,765,975 | 10/1973 | Hollingsworth | 156/94 |
| 3,988,400 | 10/1976 | Luhman III | 264/36 |
| 3,993,520 | 11/1976 | Werner et al. | 156/94 |
| 4,032,272 | 6/1977 | Miller | 425/12 |
| 4,047,863 | 9/1977 | McCluskey et al. | 425/13 |
| 4,132,516 | 1/1979 | Story | 425/13 |
| 4,165,397 | 8/1979 | Ogden et al. | 427/140 |
| 4,200,478 | 4/1980 | Jacino et al. | 156/94 |
| 4,291,866 | 9/1981 | Peterson | 269/1 |
| 4,385,015 | 5/1983 | Klettke | 264/36 |
| 4,569,808 | 2/1986 | Smali | 425/12 |
| 4,681,520 | 7/1987 | Birkhauser III | 425/12 |
| 4,744,841 | 5/1988 | Thomas | 264/36 |
| 4,775,305 | 10/1988 | Alexander et al. | 425/12 |
| 4,776,780 | 10/1988 | Banks | 425/12 |
| 4,814,185 | 3/1989 | Jones | 425/12 |
| 4,820,148 | 4/1989 | Anderson | 425/12 |
| 4,826,413 | 5/1989 | Matles | 425/12 |

Primary Examiner—Jay H. Woo
Assistant Examiner—James P. Mackey
Attorney, Agent, or Firm—Haverstock, Garrett and Roberts

[57] ABSTRACT

Apparatus for repairing laminated glass including a resin injector member engagable with a support member attachable to a laminated glass surface while in a vertically installed position. The resin injector member includes (1) a tubular body portion having a openings at each opposed end, a tubular tip portion positioned in one of the ends and a tubular vacuum stem extending outwardly perpendicular to the body portion, (2) a tubular mid-portion having openings at each opposed end disposed to fit snugly within the body portion, and (3) a cylindrical plunger portion, one end having cross hatches for gripping action and an opposed end disposed to fit snugly within the mid-portion. The support member includes (1) a planar base member, (2) at least one leg member for supporting the base member, (3) a suction cup attachable to the base member, and (4) an aperture extending through the base member for the engagement of the resin injector member. The engaged resin injector member and support member are removably attached with a suction cup to a damaged laminated glass surface for the repair thereof.

11 Claims, 2 Drawing Sheets

APPARATUS FOR WINDSHIELD REPAIR

FIELD OF THE INVENTION

The present invention relates generally to a method and apparatus for use in repairing cracks, breaks and chips in windshields, plate glass and other laminated glass surfaces and, more particularly, to a rigid support member and injector adapted to be removably attached to a glass surface.

PRIOR ART

The present resin injector and support device is specifically adapted for use with windshields and the like. U.S. Pat. Nos. 3,988,400; 4,291,866; 4,681,520 and 4,776,780 disclose various devices used in the repair of windshields. The present device replaces the probes and injector mechanisms shown in these prior art patents with a more precise, effective, and easier to use device.

SUMMARY OF THE INVENTION

The present invention overcomes many of the disadvantages and short comings associated with known resin injector devices, and teaches the construction and operation of a laminated glass repair apparatus which attaches easily to a windshield or like laminated glass surface. By varying the pressure within the device with a vacuum source and by applying a direct force to the conical portion of a break, the process time of repairing the laminated glass is significantly reduced due to the removal of air and moisture from within the windshield crack or break. To do this, a low pressure area is first created within the crack or break to remove the air and moisture and then resin is positioned above the break and the vacuum source removed. Atmospheric pressure thereby enters the injector pushing the resin into the damaged area much quicker and easier than with the prior methods as will be discussed in greater detail below.

This device includes an injector having three interlocking telescopic portions, and one pliable elongated tip portion having at least one opening in the side thereof which attaches by friction fit into the forward open end of the outer most telescopic portion, and a rigid support having a planar base, at least one leg for support, an aperture, and a suction cup for attachment to a glass surface.

One very important feature of the present device is an elongated perforated tip portion of the injector which is designed to have at least one opening or slot in the side thereof to align with a vacuum stem disposed on the outer-most telescopic portion of the resin injector. Also the tip portion is formed to have flanges in the interior thereof to control resin movement and create an air tight seal with other portions of the injector. Another important feature is the support which has an aperture through which the injector may be threadedly engaged from the underneath surface thereof so that engagement is not hindered or curtailed by the vacuum stem which protrudes from the resin injector. The engaged injector and support may then be positioned on the damaged non-porous laminated glass surface, and by gently pushing downwardly on the planar base portion of the support air is dispelled from under the pliable suction cup portion of the device which removeably affixes the present device to the surface to be repaired. These novel features of the present apparatus allow for quicker and easier repair of glass surfaces.

It is therefore a principal object of the present invention to provide a faster and more efficient device for repairing cracks, breaks and chips in laminated glass surfaces.

Another object is to provide a laminated glass repair device that is structurally and operationally less complex and inexpensive to make and use.

Another object is to provide a laminated glass repair device having means associated therewith for enabling effective removal of air and moisture from within the crack or chip in the glass.

Another object is to provide a laminated glass repair device wherein he diameter of the injector and the diameter of the support aperture are of a standardized size in the field.

Another object is to provide a laminated glass repair device having a flanged elongated tip member which creates an air tight seal with other portions of the device to eliminate the need for an o-ring to maintain the vacuum pressure in the forward portion thereof.

Another object is to provide a laminated glass repair device wherein the elongated tip member has at least one opening therein to align and allow communication between the vacuum stem and the interior of the device.

Another object is to teach the construction of a laminated glass repair device having an injector including three telescopic portions which can be quickly, easily , and accurately refilled.

Another object is to provide a laminated glass repair device that is easily maintained, installed, and removed.

These and other objects and advantages of the present invention will become apparent to those skilled in the art after considering the following detailed specification which discloses the present device and several representative embodiments of the tip portion thereof with the accompanying drawings wherein:

DESCRIPTION OF THE PREFERRED EMBODIMENT

Figure 2:
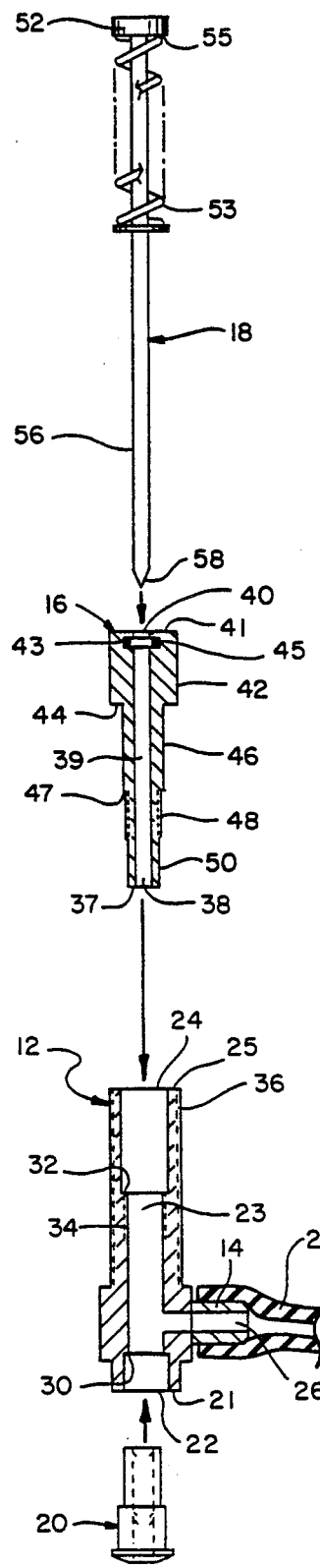
FIG. 2 is an exploded cross-sectional view showing the resin injector of FIG. 1.
Figure 1:
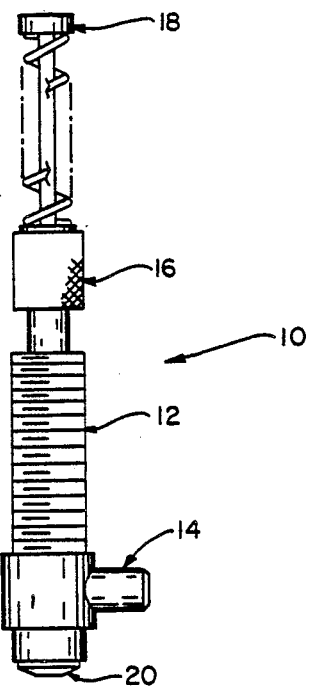
FIG. 1 is a side perspective view of the resin injector portion of the present device in assembled condition.
Figure 3:
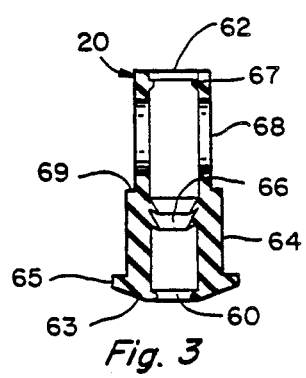
FIG. 3 is an enlarged cross-sectional view of the tip portion of the present resin injector.
Figure 5:
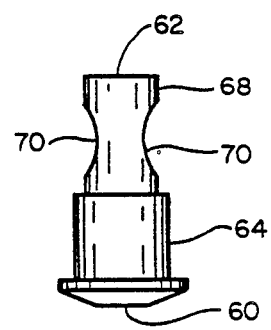
FIG. 5 is a fragmentary perspective view of an embodiment of the tip portion of FIG. 3.
Figure 4:
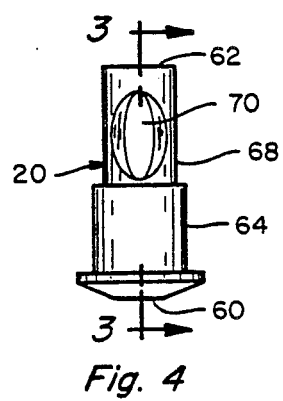
FIG. 4 is an enlarged perspective view showing the tip portion of the resin injector of FIG. 3.
Figure 6:
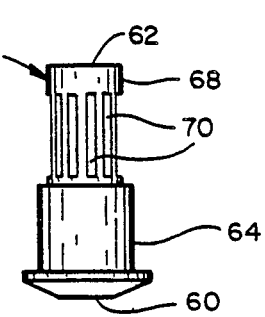
FIG. 6 is a fragmentary perspective view of another embodiment of the tip portion of FIG. 3.
Figure 7:
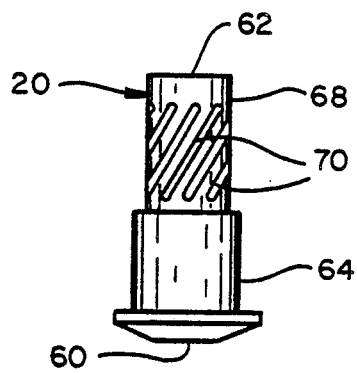
FIG. 7 is a fragmentary perspective view of still another embodiment of the tip portion of FIG. 3.
Figure 8:
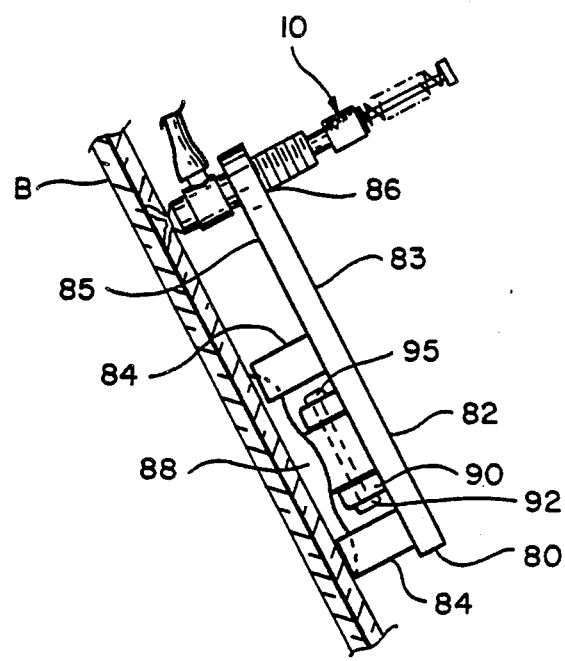
FIG. 8 is a side elevational view of the support assembly portion of the present device including the resin injector portion.
Figure 9:
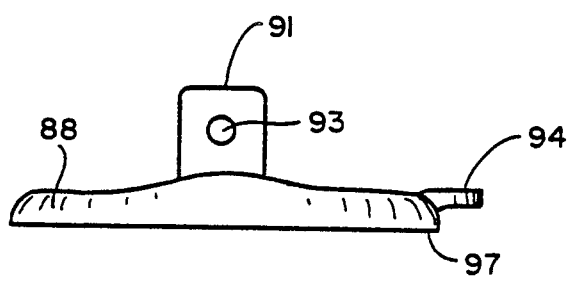
FIG. 9 is a side perspective view showing the suction cup portion of the support assembly of FIG. 8.

Referring to the drawings more particularly by reference numbers, wherein like numerals refer to like parts, number 10 in FIGS. 1, 2 and 8 identifies a resin injector constructed according to the teachings of the present invention. The resin injector 10 is specifically designed to be removably fixed to extend through a support assembly 80 as shown in FIG. 8 for mounting on a windshield B or the like. The resin injector 10 and support assembly 80 are used in combination for repairing cracks, chips and breaks in the surface of a windshield B or other laminated glass surface. The present resin injector 10 comprises a three-piece telescoping construction formed by an outer body portion 12, a middle injector portion 16 and an inner plunger portion 18.

The outer body portion 12 is tubular in shape having a distal opening 22 and a proximal opening 24 at each opposed end thereof. A passage 23 connects openings 22 and 24 and has a slightly smaller diameter than that of openings 22 and 24 which thereby forms protruding edges or seat members 30 and 32. Threaded engagement means 34 are located in passage 23 for engagement with middle injector portion 16. Connecting at a right angle with passage 23 near the distal opening 22 of outer body portion 12 is an outwardly extended tubular vacuum stem 14 having outer opening 26 to which a vacuum hose 28 and vacuum source (not pictured) can be removeably attached. Located on the exterior surface of the outer body portion 12 between vacuum stem 14 and rearward edge 25 are threaded engagement means 36 for engagement with support member 80 as will be discussed in more detail below.

The middle injector portion 16 which removeably engages within the outer body portion 12 is tubular in shape having a forward open end 38 and a rearward open end 40. Rearward open end 40 is of the same diameter as forward open end 38 and is connected by channel 39. The forward portion 50 of middle injector portion 16 is of a diameter just slightly smaller than that of passage 23 and has threadedly engagable means 48 for attachment within passage 23. Adjacent to portion 50 is a mid portion 46 which has a slightly larger diameter than that of portion 50 thus creating seat 47 which when middle injector portion 16 is fully inserted into outer body member 12, causes seat 47 to abut seat 32 to prevent further forward movement thereof. Adjacent to mid-portion 46 are gripping means 42 which extend to edge 41. The diameter of the gripping means 42 is slightly larger than that of mid portion 46 which creates another seat 44. When middle injector portion 16 is fully inserted into outer body portion 12, seat 14 likewise abuts rearward edge 25 of proximal opening 24. Inside rearward open end 40 of middle injector portion 16 is an o-ring 43 positioned in a groove 45 for engagement with the inner plunger portion 18 to create an air tight seal therewith.

Inner plunger portion 18 is generally cylindrical in shape, forming a plunger for insertion within middle injector portion 16. Inner plunger portion 18 has a rod portion 56 which has a diameter slightly smaller than that of channel 39 so as to fit snugly therein and a small rounded or sharply pointed free end 58. Adjacent to rod portion 56 is gripping means 52 having a greater diameter than that of rod portion 56 thus creating seat 55 and having cross-hatching or the like to allow for greater gripping action. Attached to seat 55 of gripping means 52 is a spring member 53 which extends around the rearward portion of rod member 56 to prevent inner plunger portion 18 from slipping completely into middle injector portion 16 unless desired and so positioned. When inner plunger portion 18 is fully inserted against the force of spring member 53 within middle injector portion 16, spring member 53 is compressed between edge 41 and seat 55. When in this position, free end 58 of inner plunger portion 18 protrudes outwardly beyond a tip member 20 positioned in distal opening 22. When the force applied to inner plunger portion 18 is released, spring member 53 returns inner plunger portion 18 to its original positioning.

The forward most portion of the present device, tip member 20 illustrated in FIGS. 1 and 3-7, is an elongated tip which slips into and is held by friction fit within distal opening 22. Tip member 20 is tubular in shape having two opposed openings 60 and 62 and has two sections 64 and 68 of varying diameter. Forward section 64 is largest in diameter having a diameter slightly smaller than that of distal opening 22. Likewise, section 64 has an outwardly extending flange 65 which abuts an edge 21 of distal opening 22 to prevent tip member 20 from slipping completely into distal opening 22. Tip member 20 also has an inwardly extending flange 63 which partially obstructs opening 60. Elongated section 68 of tip 20 is smaller in diameter than section 64 and is slightly smaller than that of passage 23 so as to fit snugly therein. Between sections 64 and 68 is seat 69 which when tip member 20 is properly positioned within distal opening 22, abuts seat member 30. Inside section 68, near opening 62, is an inwardly extending flange 67. When all three portions 12, 16 and 18 are engaged, flange 67 along with edge 37 of opening 62 and free end 58 form an air tight seal thus eliminating any need for o-rings and the like in the outer body portion 12. A double row of forwardly biased flanges 66 are likewise disposed in the forward interior portion of the tip member 20 to control resin movement. Also in section 68 of tip member 20 is one or more openings 70. Shown in FIGS. 4-7 are various embodiments of tip member 20 with variations in openings 70 which allow for the communication of air between the interior area of tip member 20 and the environment outside vacuum stem 14. Through this air communication, pressure cycles are created which speed up the repair process of laminated glass as will be discussed later in more detail. Openings 70 can be a single opening formed in a circular shape and aligned with vacuum stem 14 or for simplicity and so that no alignment is required, vertically or diagonally extending slots or the like can likewise be formed therein.

The support assembly 80 of the present device has a planar base 82 having an upper surface 83, a lower surface 85 and an aperture 86 extending therethrough and at least one leg 84 to maintain the base 82 in a position above the surface of the windshield B or other laminated glass surface. Two attachment pegs 90 extend outwardly from lower surface 85 of base 82 to a lesser degree than leg 84, and have apertures 92 aligned and extending completely therethrough. A suction cup 88 made of natural rubber or a like resilient synthetic material is designed to have a more rigid block portion 91 formed on the top thereof pierced by passage 93 which extends therethrough. The block portion 91 is positioned between pegs 90 so that apertures 92 and passage 93 are aligned. A rod member 95 is then slipped through aligned aperatures 92 and passage 93 to fasten block portion 91 and thus suction cup 88 to base 82. Rod member 95 is held in place by friction fit. Suction cup 88 having an outer edge 97 and a thumb tab member 94 attached thereto is used to removably attach the present support assembly 80 to windshield B or like laminated glass surface and may be released by pushing upwardly with one's thumb on thumb tab member 94.

The preferred method of using the present device is to align openings 70 of tip member 20 with vacuum stem 14 and fully insert tip member 20 into distal opening 22 until seat 69 abuts seat member 30. Vacuum hose 28 having one end already attached to a vacuum source is then attached to vacuum stem 14. From the lower surface 85 of base 82, rearward edge 25 of outer body portion 12 is inserted into aperture 86 and attached thereto by means of threadedly engagable means 36. After engaging outer body portion 12 and support assembly 80, a force is sharply applied on the upper surface 83 of base 82 to removably attach the Present device by means of suction cup 88 to windshield B or other laminated glass surface to be repaired.

In filling the present device with resin, the inner plunger portion 18 is inserted into middle injector portion 16. Submerging edge 37 of middle injector portion 16 in the resin source, inner plunger portion 18 is then partially withdrawn from within middle injector portion 16 thus creating a vacuum which pulls the resin material up into channel 39 of middle injector portion 16. Afterwards, middle injector portion 16 is inserted into outer body portion 12 and engaged therewith. At this stage, edge 37 is within opening 62 of tip member 20 abutting flange 67 to create an air tight seal. The vacuum source is attached to the vacuum stem 14 and a vacuum pressure is applied. The vacuum pressure created is a low static vacuum which serves to pull air and moisture out from within the crack, break or chip in the laminated glass surface, while not being of a strong enough force to displace the resin material positioned in channel 39. After removing the air and moisture from within the break, inner plunger portion 18 is partially inserted into middle injector portion 16 and maintained in this position by the gripping action of o-ring 43. When inner plunger portion 18 is partially inserted into middle injector portion 16, free end 58 of rod portion 56 forces the resin material into the forward interior portion of tip member 20 forward of biased flanges 66. Inner plunger portion 18 is then returned to its former position abutting flange 67. The vacuum source is then released allowing air at atmospheric pressure to enter into tip member 20 through openings 70 and vacuum stem 14, above the surface of the resin. This creates a high pressure area above the resin while having the low pressure area remaining within the break, causing the resin material to be quickly and easily sucked down into the break. This process called a "cycle" may be repeated numerous times until all air is removed from the break and resin has completely filled the void. However, upon subsequent vacuuming of the break, less air is removed from within the break and thus less of a low pressure are and less suction is created. Therefore in subsequent cycles, after the vacuum source has been removed to allow air at atmospheric pressure to enter the device, the middle injector portion 16 is again partially inserted into the device crating additional pressure on the air and resin within the conical "bullseye" breaks, another feature of the present device may be used to force resin into the damaged area. In repairing such a bulls eye break, the resin is first forced into the break as described above. Inner plunger portion 18 is then fully inserted into engaged middle injector portion 16 whereby free end 58 extends outwardly beyond tip member 20 to contact the apex of the detached conical portion of glass, pushing the same downwardly. In so doing, additional vacuum is created as the air space is increased in the break allowing the resin to flow into its place. This procedure again achieves a more rapid rate of repair and is called "flexing the cone." Like the cycles discussed previously, flexing the cone, may be repeated as many times as required to completely fill the damaged surface and is preferably done in combination with the cycles.

Once the break has been completely filled, the present device may be removed from the freshly repaired laminated glass surface by pushing upwardly on thumb tab member 94 of suction cup 88. An ultraviolet light source is then provided to cure the resin material.

Although it is recognized that various acceptable materials of construction are available and could equally be employed to construct the present device, it is usually preferred that the device, with the exclusion of tip member 20 and suction cup 88, be constructed from a relatively rigid plastic material that does not deteriorate quickly and is able to withstand moderate impact and mishandling without breakage. Any of the known relatively rigid plastic materials may be used. Such rigid plastic materials include phenolic resins, vinyl resins, polyolefin resins, polycarbonates, nylon compositions etc. It is also recognized that certain metals, metal alloys, fiberglass, or other materials could be utilized in the practice of this invention, but plastics have been found to be preferred.

The tip member and suction cup are preferred to be constructed from a more resilient natural or synthetic material such as rubber or plastic. Additionally, the overall length and diameter of the device can vary greatly. However, for use in glass repair, the present device will be relatively small ranging between approximately two and one half to four inches in length and having the diameter of the outer housing portion at approximately one half inch as is standard in the field.

The resins which are useful in repairing cracks and chips in laminated glass surfaces are commercially available resins with good flow properties and capable of rapid curing. One particularly useful class of resins are commercially available acrylic resins which flow easily and cure rapidly under ultraviolet light. A uniquely useful resin is the acrylic resin presently marketed by Liquid Resin International, Ltd. of Olney, Ill. Other resins which can be used in practice of this invention include polyvinyl butyral resins, certain epoxy resins and others with similar chemical and physical characteristics.

Thus there has been shown and described a novel laminated glass repair device for use in repairing broken, chipped or cracked laminated glass including windshields and plate glass which device fulfills all of the objects and advantages sought therefor. Many changes, modifications, variations and other uses and applications of the present construction will however, become apparent to those skilled in the art after considering this specification and the accompanying drawings.

All such changes, modifications, variations, and other uses and applications which do not depart from the spirit and scope of the invention are deemed to be covered by the invention which is limited only by the claims which follow.

What is claimed is:

1. An apparatus for repairing laminated glass consisting essentially of
   (1) a resin injector member having a tubular tip portion and three telescoping portions having means of engagement for stationary positioning thereof, including, a tubular body portion having openings at each opposed end thereof, a tubular vacuum stem extending outwardly from said body portion, a tubular tip portion positioned in one of the said openings having an opening therein adapted to provide access to said vacuum stem, a tubular mid-portion having an opening at each opposed end thereof and disposed to fit snugly within said body portion, and a cylindrical plunger portion, one end having a slightly enlarged portion adapted for gripping said plunger portion and an opposed end disposed to fit snugly within said mid-portion; and (2) a support member having a planar base member, at least one leg member for supporting said base member, a suction cup, means of attachment for fixing said suction cup to said base, and an aperture through said base member having means for engaging said injector member, wherein said support member and said injector member are removeably engaged and attached by means of said suction cup to a laminated glass surface for repair thereof.

2. The apparatus for repairing laminated glass as defined in claim 1 wherein said tubular tip portion is secured by friction fit in said opening of said body portion and said opening in said tip portion is located in a side of said tip portion for alignment with said vacuum stem.

3. The apparatus for repairing laminated glass as defined in claim 1 wherein a thumb tab member extends outwardly and upwardly from an outer edge of said suction cup for removal of said support member from said glass surface.

4. The apparatus for repairing laminated glass as defined in claim 1 wherein said injector member is constructed of a rigid synthetic material.

5. The apparatus for repairing laminated glass as defined in claim 1 wherein said tubular tip portion is constructed of a resilient material selected from the group consisting of natural rubber, synthetic polymers and synthetic monomers.

6. The apparatus for repairing laminated glass as defined in claim 1 wherein said plunger portion, said mid portion, and said tip portion when engaged within said body portion form an air-tight seal.

7. A laminated glass repair apparatus consisting essentially of: a support device and a sectional resin injector having means of engagement for engaging with said support device, said sectional resin injector including;
(1) an outer and a mid member wherein said outer member has means of engagement for both the attachment of a vacuum source and the attachment of said mid member,
(2) a tubular elongated tip member having means for slidable positioning and attachment within said outer member and having at least one opening therein with means for attachment to said vacuum source, and
(3) a plunger member slidably receivable within said mid member, whereby said sectional injector and said support device are used in conjunction to fill a chipped, cracked, or broken laminated glass surface with resin.

8. The laminated glass repair apparatus of claim 7 wherein said support device includes a suction cup, whereby said apparatus is adapted to be attached to a windshield by means of said suction cup.

9. The laminated glass repair apparatus of claim 7 wherein said opening in said tip member is located in a side of said tip member for alignment with said vacuum source.

10. The laminated glass repair apparatus of claim 7 wherein said tip member has means disposed on the interior surface thereof for regulating resin movement.

11. The laminated glass repair apparatus of claim 7 herein said tip member has means for maintaining an air-tight seal with said mid member and said plunger member.

* * * * *

UNITED STATES PATENT AND TRADEMARK OFFICE
CERTIFICATE OF CORRECTION

PATENT NO. : 4,995,798
DATED : February 26, 1991
INVENTOR(S) : Stephen L. Ameter It is certified that error appears in the above—identified patent and that said Letters Patent is hereby corrected as shown below:

column 2, line 15, "he" should be --the-- column 3, line 44, "14" should be --44-- column 5, line 10, "Present" should be --present-- column 5, line 51, "are" should be --area-- column 5, line 55, "crating" should be --creating-- column 5, line 56, after "the" insert --device to force the resin down into the break. In the repair of -- column 8, line 35, "herein" should be --wherein--.

Signed and Sealed this

Sixth Day of October, 1992

*Attest:*

DOUGLAS B. COMER

*Attesting Officer*      *Acting Commissioner of Patents and Trademarks*